United States Patent
Kwon et al.

(10) Patent No.: US 11,561,438 B2
(45) Date of Patent: *Jan. 24, 2023

(54) LIQUID CRYSTAL ALIGNMENT AGENT COMPOSITION, AND LIQUID CRYSTAL ALIGNMENT FILM, AND LIQUID CRYSTAL DISPLAY USING THE SAME

(71) Applicant: LG CHEM, LTD., Seoul (KR)

(72) Inventors: Soonho Kwon, Daejeon (KR); Jung Ho Jo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/046,229

(22) PCT Filed: Jan. 16, 2020

(86) PCT No.: PCT/KR2020/000805
§ 371 (c)(1),
(2) Date: Oct. 8, 2020

(87) PCT Pub. No.: WO2020/153659
PCT Pub. Date: Jul. 30, 2020

(65) Prior Publication Data
US 2021/0171832 A1    Jun. 10, 2021

(30) Foreign Application Priority Data

Jan. 21, 2019  (KR) .................. 10-2019-0007630
Jan. 15, 2020  (KR) .................. 10-2020-0005494

(51) Int. Cl.
| | |
|---|---|
| C09K 19/56 | (2006.01) |
| G02F 1/1337 | (2006.01) |
| C09K 19/38 | (2006.01) |
| G02F 1/1333 | (2006.01) |

(52) U.S. Cl.
CPC ........ *G02F 1/133719* (2013.01); *C09K 19/38* (2013.01); *C09K 19/56* (2013.01); *G02F 1/133365* (2013.01); *C09K 2323/00* (2020.08); *C09K 2323/02* (2020.08); *C09K 2323/027* (2020.08)

(58) Field of Classification Search
CPC ................ C09K 19/56; C09K 2323/00; C09K 2323/02; C09K 2323/027; B05D 3/065; B05D 5/061; C08L 79/08; C08L 2205/025; G02F 1/133788; G02F 1/133723
USPC ........... 428/1.1, 1.2, 1.26; 349/123; 528/353
See application file for complete search history.

(56) References Cited

U.S. PATENT DOCUMENTS

| | | | |
|---|---|---|---|
| 10,054,820 | B2 | 8/2018 | Kang et al. |
| 10,066,166 | B2 | 9/2018 | Lee et al. |
| 2010/0243955 | A1 | 9/2010 | Tsai et al. |
| 2012/0101236 | A1 | 4/2012 | Sakumoto et al. |
| 2016/0109759 | A1 | 4/2016 | Kang et al. |
| 2018/0298284 | A1 | 10/2018 | Jo et al. |
| 2018/0348578 | A1 | 12/2018 | Jo et al. |
| 2019/0106628 | A1 | 4/2019 | Yun et al. |
| 2020/0392409 | A1 | 12/2020 | Yun et al. |

FOREIGN PATENT DOCUMENTS

| | | |
|---|---|---|
| EP | 3575381 A1 | 12/2019 |
| JP | 2012-150251 A | 8/2012 |
| JP | 2012-193167 A | 10/2012 |
| JP | 2013-167888 A | 8/2013 |
| JP | 2015-212807 A | 11/2015 |
| JP | 2015-215591 A | 12/2015 |
| JP | 2015-222387 A | 12/2015 |
| JP | 2016-081057 A | 5/2016 |
| JP | 2016-218149 A | 12/2016 |
| JP | 2017-009655 A | 1/2017 |
| JP | 2020-510235 A | 4/2020 |
| KR | 10-2009-0119286 A | 11/2009 |
| KR | 10-2011-0079733 A | 7/2011 |
| KR | 10-2012-0084253 A | 7/2012 |
| KR | 10-2013-0001144 A | 1/2013 |
| KR | 10-2013-0109018 A | 10/2013 |
| KR | 10-2014-0076427 A | 6/2014 |
| KR | 10-2015-0118527 A | 10/2015 |
| KR | 10-2015-0122584 A | 11/2015 |
| KR | 10-2016-0047030 A | 5/2016 |
| KR | 10-2016-0095801 A | 8/2016 |
| KR | 10-2017-0028473 A | 3/2017 |
| KR | 10-2017-0063677 A | 6/2017 |

(Continued)

OTHER PUBLICATIONS

PCT Search Report issued for PCT/KR2019/015358 dated Mar. 4, 2020, 2 pages.
PCT Search Report issued for PCT/KR2019/015359 dated Mar. 4, 2020, 2 pages.
PCT Search Report issued for PCT/KR2020/000805 dated Apr. 29, 2020, 2 pages.
Extended European Search Report dated Nov. 23, 2020, of the corresponding European Patent Application No. 20744241.9, 7 pages.

*Primary Examiner* — Ruiyun Zhang
(74) *Attorney, Agent, or Firm* — Rothwell, Figg, Ernst & Manbeck, P.C.

(57) ABSTRACT

The present disclosure relates to a liquid crystal alignment agent composition including: a polymer for liquid crystal alignment agent and a crosslinker compound in which a terminal crosslinking functional group is capped with a silicon-containing thermally removable protecting group, wherein a change in the number of particles during storage is lower than a certain level, a method for preparing a liquid crystal alignment film using the liquid crystal alignment agent composition, and a liquid crystal alignment film and a liquid crystal display device using the liquid crystal alignment agent film.

15 Claims, No Drawings

(56) References Cited

FOREIGN PATENT DOCUMENTS

| | | | |
|---|---|---|---|
| KR | 10-2017-0127966 A | | 11/2017 |
| KR | 10-2017-0143365 A | | 12/2017 |
| KR | 10-1823712 B1 | | 1/2018 |
| KR | 10-2018-0020722 A | | 2/2018 |
| KR | 10-2019-0003233 A | | 1/2019 |
| KR | 20190087819 A | * | 7/2019 |
| TW | 201035171 A | | 10/2010 |
| TW | 201231505 A | | 8/2012 |
| TW | 201540777 A | | 11/2015 |
| WO | 2010-114103 A1 | | 10/2010 |
| WO | 2011-149071 A1 | | 12/2011 |
| WO | 2015-072554 A1 | | 5/2015 |
| WO | 2016-047774 A1 | | 3/2016 |
| WO | 2017-196001 A1 | | 11/2017 |
| WO | 2018-092811 A | | 5/2018 |

* cited by examiner

LIQUID CRYSTAL ALIGNMENT AGENT COMPOSITION, AND LIQUID CRYSTAL ALIGNMENT FILM, AND LIQUID CRYSTAL DISPLAY USING THE SAME

CROSS CITATION WITH RELATED APPLICATION(S)

This application is a 35 U.S.C. 371 National Phase Entry application from PCT/KR2020/000805 filed on Jan. 16, 2020, designating the United States, which claims the benefit of priority based on Korean Patent Application No. 10-2019-0007630 filed on Jan. 21, 2019 and Korean Patent Application No. 10-2020-0005494 filed on Jan. 15, 2020 in the Korean Intellectual Property Office, the disclosures of which are incorporated herein by reference in their entity.

TECHNICAL FIELD

The present disclosure relates to a liquid crystal alignment agent composition capable of realizing improved storage stability and electrical characteristics while having excellent film strength, and a liquid crystal alignment film and a liquid crystal display device using the same.

BACKGROUND ART

In a liquid crystal display device, a liquid crystal alignment film plays a role of aligning liquid crystals in a predetermined direction. Specifically, a liquid crystal alignment film acts as a director for the arrangement of liquid crystal molecules, and thus, when the liquid crystals move due to an electric field to form an image, it allows the liquid crystals to align in an appropriate direction. Generally, in order to obtain uniform brightness and a high contrast ratio in a liquid crystal display device, it is essential to uniformly align liquid crystals.

As one of the conventional methods of aligning liquid crystals, a rubbing method of coating a polymer film such as polyimide onto a substrate such as glass or the like and rubbing a surface thereof using fibers such as nylon or polyester in a predetermined direction has been used. However, the rubbing method may cause serious problems during manufacturing process of the liquid crystal panel because fine dust or electrostatic discharge (ESD) occurs when the fiber and polymer film are rubbed.

In order to solve the problems of the rubbing method, a photo-alignment method for inducing anisotropy in a polymer film by light irradiation rather than the rubbing, and aligning liquid crystals using anisotropy has been studied recently.

As materials that can be used for the photo-alignment method, various materials have been introduced, among which polyimide is mainly used for various superior performance of a liquid crystal alignment film. For this purpose, after coating in the form of a precursor such as polyamic acid or polyamic acid ester, a heat treatment process is performed at a temperature of 200° C. or more and 230° C. or less to form a polyimide, which is then irradiated with light to perform an alignment treatment.

However, a large amount of energy is required for obtaining sufficient liquid crystal alignment properties by subjecting the films of polyimide to light irradiation, and therefore, not only it is difficult to secure actual productivity, but also an additional heat treatment process is needed for securing alignment stability after the light irradiation. Due to an increase in size of the panel, a column space (CS)—sweeping phenomenon occurs in the manufacturing process, and haze is generated on the surface of the liquid crystal alignment film, which causes a galaxy problem. Thus, there was a limitation in that the performance of the panel cannot be sufficiently realized.

In addition, a high voltage holding ratio (VHR) should be exhibited for high-quality driving of the liquid crystal display device, but it is difficult to exhibit the same by using only polyimide. In particular, recently, as the demand for low-power displays has increased, it has been discovered that liquid crystal alignment agents can affect not only the fundamental properties of the alignment of liquid crystal but also electrical characteristics such as after-image or voltage holding ratio caused by a DC/AC voltage. Accordingly, there is an increasing need to develop liquid crystal alignment materials capable of realizing excellent liquid crystal alignment properties and electrical characteristics at the same time.

In this regard, in order to produce a liquid crystal alignment film with high film strength required in the display field, a method of adding various crosslinking agents to the liquid crystal alignment agent composition has been proposed, but as the stability of the crosslinker compound decreases and the liquid crystal alignment agent composition has difficulty in achieving uniformity, there was a limit that reliability was reduced. In addition, the electrical characteristics at high temperature and low frequency were reduced due to the simple addition of the crosslinker compound, making it difficult to manufacture a liquid crystal alignment film applicable to high performance/low power displays.

In view of the above, there is a need to develop a liquid crystal alignment agent composition capable of improving alignment characteristics, storage stability, and electrical characteristics of an alignment film even while producing an alignment layer having high film strength.

BRIEF SUMMARY OF THE INVENTION

The present disclosure provides a liquid crystal alignment agent composition capable of realizing improved storage stability and electrical characteristics while having excellent film strength during the synthesis of a liquid crystal alignment film.

The present disclosure also provides a liquid crystal alignment film including an aligned cured product of the liquid crystal alignment agent composition, and a liquid crystal display device including the same.

In one aspect of the present disclosure, there is provided a liquid crystal alignment agent composition including a polymer for liquid crystal alignment agent, and a crosslinker compound in which a terminal crosslinking functional group is capped with a silicon-containing thermally removable protecting group, wherein a change in the number of particles according to Equation 1 below is 30 or less.

Change in Number of Particles $(\Delta EA) = EA_1 - EA_0$    [Equation 1]

in Equation 1, $EA_0$ is the number of particles having a particle size of 0.5 μm or more contained in the liquid crystal alignment agent composition at the first point of time (0 seconds) at which the liquid crystal alignment agent composition is obtained, and $EA_1$ is the number of particles having a particle size of 0.5 μm or more contained in the liquid crystal alignment agent composition at the point of time after storing the liquid crystal alignment agent composition at minus 20° C. or more and 0° C. or less for 30 days from the first point of time (0 second).

In another aspect of the present disclosure, there is provided a liquid crystal alignment film including an aligned cured product of the liquid crystal alignment agent composition, and a liquid crystal display device including the same.

DETAILED DESCRIPTION OF THE INVENTION

Hereinafter, a liquid crystal alignment agent composition, a liquid crystal aligning film and a liquid crystal display device using the same according to specific embodiments of the present disclosure will be described in more detail.

Unless specified otherwise herein, the following terms can be defined as follows.

Throughout the specification, when one part "includes" one constituent element, unless otherwise specifically described, this does not mean that another constituent element is excluded, but means that another constituent element may be further included.

As used herein, the term "substituted" means that other functional groups instead of a hydrogen atom in the compound are bonded, and a position to be substituted is not limited as long as the position is a position at which the hydrogen atom is substituted, that is, a position at which the substituent can be substituted, and when two or more are substituted, the two or more substituents may be equal to or different from each other.

As used herein, the term "substituted or unsubstituted" means being unsubstituted or substituted with one or more substituents selected from the group consisting of deuterium; a halogen group; a cyano group; a nitro group; a hydroxyl group; a carbonyl group; an ester group; an imide group; an amide group; an amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an arylphosphine group; or a heterocyclic group containing at least one of N, O, and S atoms, or being unsubstituted or substituted with a substituent to which two or more substituents are linked among the substituents exemplified above. For example, "the substituent to which two or more substituents are linked" may be a biphenyl group. That is, the biphenyl group may also be an aryl group, and may be interpreted as a substituent to which two phenyl groups are linked.

As used herein, the notation ╋, or ─ means a bond linked to another substituent group, and the direct bond means the case in which no separate atom is present at a part represented by L.

In the present specification, the alkyl group may be linear or branched, and the number of carbon atoms is particularly limited, but is preferably 1 to 10. According to another embodiment, the number of carbon atoms of the alkyl group is 1 to 6. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl and the like, but are not limited thereto.

In the present specification, the haloalkyl group means a functional group in which a halogen group is substituted in the above-mentioned alkyl group, and examples of the halogen group include fluorine, chlorine, bromine or iodine. The haloalkyl group may be substituted or unsubstituted.

The Group 15 element may be nitrogen (N), phosphorus (P), arsenic (As), tin (Sn) or bismuth (Bi).

Nitrogen oxide is a compound in which a nitrogen atom and an oxygen atom are bonded, and a nitrogen oxide functional group means a functional group containing a nitrogen oxide in the functional group. As an example of the nitrogen oxide functional group, a nitro group ($-NO_2$) or the like can be used.

In the present specification, the aryl group is a monovalent functional group derived from arene, and is not particularly limited, but preferably has 6 to 20 carbon atoms, and may be a monocyclic aryl group or a polycyclic aryl group. The monocyclic aryl group may include, but not limited to, a phenyl group, a biphenyl group, a terphenyl group, or the like. The polycyclic aryl group may include, but not limited to, a naphthyl group, an anthracenyl group, a phenanthryl group, a pyrenyl group, a perylenyl group, a chrycenyl group, a fluorenyl group or the like. The aryl group may be substituted or unsubstituted.

In the present specification, the arylene group is a bivalent functional group derived from arene, and the description of the aryl group as defined above may be applied except that the arylene is a divalent functional group.

In the present specification, a multivalent organic group is a residue in which a plurality of hydrogen atoms bonding to an arbitrary compound are removed, and for example, it may be a divalent functional group, a trivalent functional group, and a tetravalent functional group. As an example, a tetravalent functional group derived from cyclobutane means a residue in which any four hydrogen atoms bonded to cyclobutane are removed.

As used herein, a direct bond or a single bond means being connected to a bond line where no atoms or atomic groups exist at the corresponding position. Specifically, it means the case where no other atoms exist in the parts represented as $R_a$ or $L_b$ (a and b are each an integer of 1 to 20) in Chemical Formula.

As used herein, the weight average molecular weight refers to a weight average molecular weight in terms of polystyrene measured by GPC method. In the process of measuring the weight average molecular weight in terms of polystyrene measured by GPC method, a detector and an analytical column, such as a commonly known analysis apparatus and differential refractive index detector can be used, and commonly applied temperature conditions, solvent, and flow rate can be used. Specific examples of the measurement conditions are as follows: Waters PL-GPC220 instrument equipped with Polymer Laboratories PLgel MIX-B, 300 mm column is used, an evaluation temperature is 40° C., 1,2,4-trichlorobenzene is used as a solvent, the flow rate is 1 mL/min, a sample is prepared at a concentration of 10 mg/10 mL and then fed in an amount of 200 μL, and the value of Mw can be determined using calibration curves formed from a polystyrene standard. The molecular weight of the polystyrene standards is five kinds of 2,000/10,000/30,000/70,000/200,000.

In the case of a conventional liquid crystal alignment agent composition, various crosslinking agents were added in order to prepare a liquid crystal alignment film having high film strength. However, in the case of a liquid crystal alignment agent composition containing a crosslinker compound, not only the stability of the crosslinker compound is lowered and long-term storage is difficult, but also it is difficult for the liquid crystal alignment agent composition to have uniformity and thus, there is a limit that the reliability decreases.

Thus, the present inventors confirmed that, when using the liquid crystal alignment agent composition that the change in the number of particles calculated by Equation 1 satisfies a specific range as described above, it is possible to manufacture a liquid crystal alignment film having enhanced reliability and stability because of having uniformity even during long-term storage.

In general, when the liquid crystal alignment agent composition is unstable, not only a reaction occurs between the compounds contained in the liquid crystal alignment agent composition to form a by-product, but also precipitation or the like occurs due to a decrease in solubility. Therefore, the number of particles contained in the liquid crystal alignment agent composition being small after long-term storage means that the liquid crystal alignment agent composition has excellent stability and is suitable for long-term storage.

Therefore, when the change in the number of particles according to Equation 1 in the liquid crystal alignment agent composition of the above one embodiment satisfies the above-mentioned range, by-products hardly form even during long-term storage, and the precipitation of the crosslinker compound due to the decrease in solubility is also small. By improving the long-term storage stability and reliability, not only the physical properties of the liquid crystal alignment film prepared from the liquid crystal alignment agent composition can be improved, but also the effect of significantly improving the efficiency of the film forming process can be realized.

On the other hand, when the change in the number of particles according to Equation 1 in the liquid crystal alignment agent composition is out of the above-mentioned range, a crosslinking reaction occurs between the crosslinker compound and the polymer for liquid crystal alignment agent during long-term storage, or due to a decrease in solubility of the crosslinker compound itself, a large number of particles are formed, and thus the liquid crystal alignment property of the liquid crystal alignment film prepared therefrom may be reduced, or may be unsuitable for long-term storage.

1. Liquid Crystal Alignment Agent Composition

According to one embodiment of the present disclosure, there can be provided a liquid crystal alignment agent composition including a polymer for liquid crystal alignment agent, and a crosslinker compound in which a terminal crosslinking functional group is capped with a silicon-containing thermally removable protecting group, wherein a change in the number of particles according to Equation 1 is 30 or less.

In Equation 1, $EA_0$ is the number of particles having a particle size of 0.5 μm or more contained in the liquid crystal alignment agent composition at the first point of time (0 seconds) at which the liquid crystal alignment agent composition is obtained, and $EA_1$ is the number of particles having a particle size of 0.5 μm or more contained in the liquid crystal alignment agent composition at the point of time after storing the liquid crystal alignment agent composition at minus 20° C. or more and 0° C. or less for 30 days from the first point of time (0 second).

In Equation 1, $EA_0$ may be the number of particles having a particle size of 0.5 μm or more, 0.5 μm or more and 100 μm or less, 0.5 μm or more and 50 μm or less, 0.5 μm or more and 10 μm or less, or 0.5 μm or more and 5 μm or less contained in the liquid crystal alignment agent composition at the first point of time (0 seconds) at which the liquid crystal alignment agent composition is obtained. And, $EA_1$ may be the number of particles having a particle size of 0.5 μm or more, 0.5 μm or more and 100 μm or less, 0.5 μm or more and 50 μm or less, 0.5 μm or more and 10 μm or less, or 0.5 μm or more and 5 μm or less contained in the liquid crystal alignment agent composition at the point of time after storing the liquid crystal alignment agent composition at minus 20° C. or more and 0° C. or less for 30 days from the first point of time (0 second).

In Equation 1, $EA_1$ may be the number of particles having a particle size of 0.5 m or more contained in the liquid crystal alignment agent composition at the point of time after storing the liquid crystal alignment agent composition at minus 20° C. or more and 0° C. or less, minus 20° C. or more and minus 10° C. or less, minus 20° C. or more and 15° C. or less for 30 days from the first point of time (0 second).

Further, in Equation 1, $EA_1$ may be the number of particles having a particle size of 0.5 μm or more contained in the liquid crystal alignment agent composition at the point of time after storing under a normal pressure condition for 30 days from the first point of time (0 second), wherein the normal pressure condition is not particularly limited to a normal atmospheric pressure, but can mean a pressure of 1 atm.

In Equation 1, the number of particles can be measured using a particle size analyzer at a temperature of 15° C. or more and 35° C. or less and a particle class of 1000 or less.

Specifically, the particle class of 1000 or less may mean a condition where the number of particles having a particle size of 0.5 μm or more existing within 1 ft$^3$ is 1000 or less.

Further, the particle size analyzer may be a device for measuring the size and number of particles using a light scattering method, and specifically, it may be a liquid particle sensor.

The light scattering method may be a principle in which the light scattered by irradiating the sample with light is detected by a photo detector and converted into an electrical signal, the size of the particle is obtained through the magnitude of the electrical signal, and the number of particles is determined via the frequency of electrical signal.

In Equation 1, the number of particles can be seen from the number of electrical signals measured to be larger than the magnitude of the electrical signal appearing for particles having a particle size of 0.5 μm, after measuring electrical signals using 4 or more and 5 or less channels among a total of 5 channels of 0.2 μm or more, 0.3 μm or more, 0.5 μm or more, 1.0 μm or more, and 2.0 μm or more using a liquid particle sensor (KS-42B, Rion Co., Ltd.) under the conditions of a temperature of 15° C. or more and 35° C. or less and a particle class of 1000 or less. Specifically, it can be calculated by adding the number of each particle measured for a channel of 0.5 μm or more, 1.0 μm or more, and 2.0 μm or more, except for the number of particles measured for a channel of 0.2 μm or more and 0.3 μm or more having a particle size of smaller than 0.5 μm.

The change in the number of particles according to Equation 1 may be 30 or less, 10 or less, 8 or less, 5 or less, 4 or less, or 3 or less.

Specifically, in Equation 1, $EA_0$ is the number of particles having a particle size of 0.5 μm or more contained in the liquid crystal alignment agent composition at the first point of time (0 seconds) at which the liquid crystal alignment agent composition is obtained, and may be 30 or less, 15 or less, 12 or less, 11 or less, 10 or less, or 8 or less.

In Equation 1, $EA_1$ may be the number of particles having a particle size of 0.5 μm or more contained in the liquid crystal alignment agent composition at the point of time after storing the liquid crystal alignment agent composition at minus 20° C. or more and 0° C. or less for 30 days from the first point of time (0 second), and may be 500 or less, 100 or less, 30 or less, 20 or less, 14 or less, 13 or less, or 12 or less.

On the other hand, when the change in the number of particles according to Equation 1 in the liquid crystal alignment agent composition is out of the above-mentioned range, a crosslinking reaction occurs between the crosslinker compound and the polymer for liquid crystal alignment agent during long-term storage, or due to a decrease in solubility of the crosslinker compound itself, a large number of particles are formed, and the liquid crystal alignment property of the liquid crystal alignment film prepared therefrom may be deteriorated or may be unsuitable for long-term storage.

The crosslinker compound included in the liquid crystal alignment agent composition of the above one embodiment may be a crosslinker compound in which a terminal crosslinking functional group is capped with a silicon-containing thermally removable protecting group. Preferably, in the crosslinker compound, all terminal crosslinking functional groups may be capped with a thermally removable protecting group.

In the crosslinker compound, a terminal crosslinking functional group refers to a functional group capable of inducing a crosslinking reaction by combining with the polymer for the liquid crystal alignment agent, and may be, for example, a hydroxy group (—OH).

In the crosslinker compound, the silicon-containing thermally-removable protecting group is a functional group substituted for a hydrogen atom in a terminal crosslinking functional group, and can suppress a crosslinking reaction between a polymer for a liquid crystal alignment agent and a crosslinker compound.

In addition, the terminal crosslinking functional group of the crosslinker compound being capped with a silicon-containing thermally-removable protecting group means that a silicon-containing thermally-removable protecting group is substituted for a hydrogen atom in the terminal crosslinking functional group as described above, and for example, the silicon-containing thermally removable protecting group may be a silicon-containing monovalent functional group.

After performing a drying step, an exposure step, a curing step, and the like, for producing a liquid crystal alignment film from a liquid crystal alignment agent composition, the thermally-removable protecting group can be desorbed while being replaced with a hydrogen atom when the temperature rises to a certain level or higher.

When the terminal crosslinking functional group of the crosslinker compound is capped with a silicon-containing thermally removable protecting group, the reactivity of the crosslinker in the initial drying step is reduced as compared to a conventional crosslinker having a crosslinking functional group at the terminal, and after the exposure step for alignment, a crosslinking reaction is initiated, and a decrease in initial alignment due to a crosslinker can be reduced.

The thermally removable protecting group introduced to the terminal of the crosslinking functional group of the crosslinker compound is desorbed and removed when heat-treated at a temperature of a certain level or higher, specifically, at a temperature of 150° C. or higher, the terminal of the crosslinking functional group is restored, and a smooth crosslinking reaction can proceed. At a temperature of less than 150° C., a crosslinking reaction is suppressed by a crosslinking functional group, thereby minimizing the formation of an unnecessary crosslinked structure and improving the stability and reliability of the composition. That is, the thermally removable protecting group introduced to the terminal of the crosslinking functional group of the crosslinker compound is desorbed and removed at a temperature of about 150° C. or more by heat treatment during the drying or firing step of the liquid crystal alignment film, and at the same time, the terminal of the crosslinking functional group is recovered and a smooth crosslinking reaction is performed, thereby improving the mechanical properties of the alignment film.

Meanwhile, the particles may include a precipitate of a crosslinker compound in which a terminal crosslinking functional group is capped with a thermally removable protecting group. The precipitate means a substance where a crystalline solid is separated and formed according to the solubility from the composition in a solution state in which the crystalline solid is dissolved. Specifically, the crosslinker compound in which the terminal crosslinking functional group is capped with a thermally removable protecting group may be precipitated from the liquid crystal alignment agent composition due to a decrease in solubility to form particles.

In general, a crosslinker compound is added to the composition for a liquid crystal alignment agent in order to increase the film strength, but in the case of an existing crosslinker compound, the solubility of the crosslinker compound becomes poor, which is precipitated from the composition for the liquid crystal aligning agent, and thus, the storage stability of the composition for the liquid crystal alignment agent becomes poor.

Meanwhile, as the composition for a liquid crystal alignment agent of the above one embodiment includes a crosslinker compound in which a terminal crosslinking functional group exhibiting excellent solubility is capped with a thermally removable protecting group, the amount of precipitation of the crosslinker compound is insignificant, and only particles of the same level as the number of particles capable of being formed in the composition for a liquid crystal alignment agent not containing the crosslinker compound are formed, thereby realizing excellent technical effects in terms of storage stability and reliability even during long-term storage.

The liquid crystal alignment agent composition of the above one embodiment may include a polymer resin solution in which the polymer for the liquid crystal alignment agent and the crosslinker group in which the terminal crosslinking functional group is capped with a thermally removable protecting group are dissolved in an organic solvent.

Specific examples of the organic solvent include N,N-dimethylformamide, N,N-dimethylacetamide, N-methyl-2-pyrrolidone, N-methylcaprolactam, 2-pyrroidone, N-ethylpyrrolidone, N-vinylpyrrolidone, dimethylsulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, and the like. They can be used alone or in combination of two or more.

The liquid crystal alignment agent composition may further include other components in addition to the organic solvent. In a non-limiting example, when the liquid crystal alignment agent composition is coated, additives capable of improving the uniformity of the thickness of a film and the surface smoothness, improving the adhesion between a liquid crystal alignment film and a substrate, changing the dielectric constant and conductivity of a liquid crystal alignment film or increasing the denseness of a liquid crystal alignment film, may be further included. Examples of such additives include various kinds of solvents, surfactants, silane-based compounds, dielectrics or crosslinking compounds, etc.

Further, the liquid crystal alignment agent composition of the one embodiment may be a liquid crystal alignment agent composition in which particles are dispersed in the polymer resin solution.

That is, to a polymer resin solution in which the polymer for the liquid crystal alignment agent and the crosslinker compound in which the terminal crosslinking functional group is capped with a thermally removable protecting group are dissolved in an organic solvent, may be further included particles including a crosslinker compound in which a terminal crosslinking functional group precipitated from the liquid crystal alignment agent composition due to the decrease in solubility is capped with a thermally removable protecting group.

The crosslinker compound in which the terminal crosslinking functional group is capped with a thermally removable protecting group may be included in an amount of 0.1% by weight or more and 30% by weight or less, or 0.1% by weight or more and 20% by weight or less, or 1% by weight or more and 20% by weight or less, or 1% by weight or more and 15% by weight or less, or 5% or more and 15% by weight or less, or 1% by weight or more and 7% by weight or less, or 13% by weight or more and 20% by weight or less, based on the solid content in the polymer resin solution.

In the case of a commonly used crosslinker compound, the terminal crosslinking functional group is not capped with a thermally removable protecting group, and thus, the solubility of the crosslinker compound becomes poor. Thereby, when the crosslinker compound is excessively contained in the liquid crystal alignment agent composition, not only a part of the crosslinker compound is precipitated to form particles and the storage stability of the liquid crystal alignment agent composition becomes poor, but also there was a problem that the alignment characteristics of the liquid crystal aligning film prepared therefrom become poor.

On the contrary, since the crosslinker compound of the one embodiment in which the terminal crosslinking functional group is capped with a thermally removable protecting group has excellent solubility, it may be included in excess in the liquid crystal alignment agent composition compared to the existing crosslinker compound, whereby the storage stability of the liquid crystal alignment agent composition is excellent, and the liquid crystal alignment film prepared therefrom can exhibit excellent film strength and liquid crystal alignment properties.

When the content of the crosslinker compound is excessively large, the degree of crosslinking of the polymer for the liquid crystal alignment agent is excessively increased, which causes a decrease in the flexibility of the polymer, and the storage stability is reduced due to the increase in viscosity of the composition, and the applicability to the substrate may be reduced due to the gelation reaction in the composition.

On the other hand, if the content of the crosslinker compound is excessively small, it is difficult to fully implement the effects of improving the mechanical strength and electrical characteristics due to an increase in the degree of crosslinking of the polymer for the liquid crystal alignment agent.

The liquid crystal alignment agent composition of the above one embodiment may include a polymer for a liquid crystal aligning agent. The polymer for the liquid crystal alignment agent is not particularly limited, but polyimide, polyimide precursor, and the like may be exemplified.

The liquid crystal alignment agent composition of the above one embodiment may include a polymer for a liquid crystal alignment agent including at least one selected from the group consisting of a polyamic acid repeating unit, a polyamic acid ester repeating unit, an polyimide repeating unit.

Specifically, the liquid crystal alignment agent composition of the above one embodiment may include a polymer for a first liquid crystal alignment agent including at least one repeating unit selected from the group consisting of a repeating unit represented by the following Chemical Formula 3, a repeating unit represented by the following Chemical Formula 4 and a repeating unit represented by the following Chemical Formula 5; and a polymer for a second liquid crystal alignment agent including at least one repeating unit selected from the group consisting of a repeating unit represented by the following Chemical Formula 6, a repeating unit represented by the following Chemical Formula 7 and a repeating unit represented by the following Chemical Formula 8.

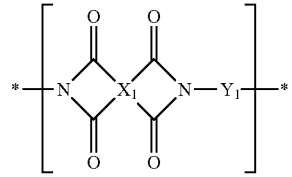

[Chemical Formula 3]

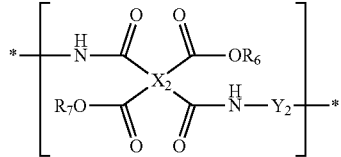

[Chemical Formula 4]

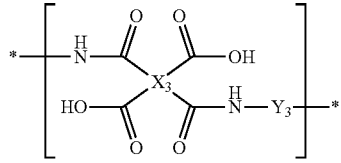

[Chemical Formula 5]

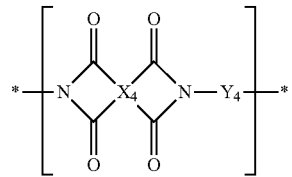

[Chemical Formula 6]

[Chemical Formula 7]

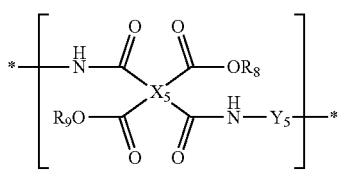

[Chemical Formula 8]

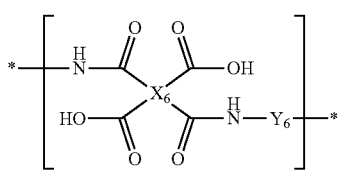

in Chemical Formulas 3 to 8, at least one of $R_6$ and $R_7$ is an alkyl group having 1 to 10 carbon atoms and the rest is hydrogen, at least one of $R_8$ and $R_9$ is an alkyl group having 1 to 10 carbon atoms and the rest is hydrogen, $X_1$ to $X_6$ are each independently a tetravalent organic group, $Y_1$ to $Y_3$ are each independently a divalent organic group represented by the following Chemical Formula 9,

[Chemical Formula 9]

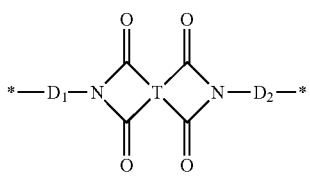

in Chemical Formula 9, T is a tetravalent organic group represented by the following Chemical Formula 10, $D_1$ and $D_2$ are each independently an alkylene group having 1 to 20 carbon atoms, a heteroalkylene group having 1 to 10 carbon atoms, a cycloalkylene group having 3 to 20 carbon atoms, an arylene group having 6 to 20 carbon atoms, or a heteroarylene group having 2 to 20 carbon atoms,

[Chemical Formula 10]

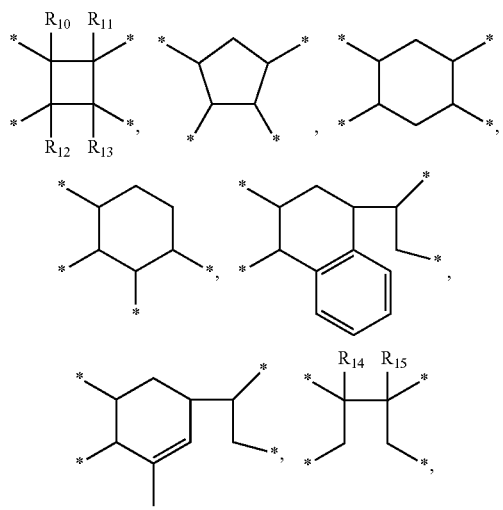

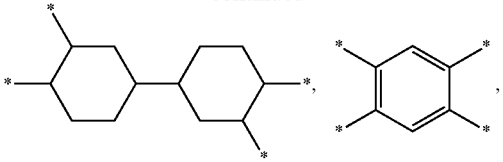

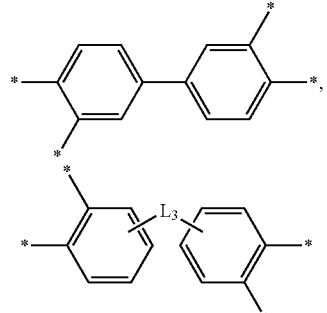

in Chemical Formula 10, $R_{10}$ and $R_{15}$ are each independently hydrogen or an alkyl group having 1 to 6 carbon atoms, $L_3$ is any one selected from the group consisting of a single bond, —O—, —CO—, —COO—, —S—, —SO—, —SO$_2$—, —CR$_{16}$R$_{17}$—, —(CH$_2$)$_z$—, —O(CH$_2$)$_z$O—, —COO(CH$_2$)$_z$OCO—, —CONH—, phenylene or combinations thereof, where $R_{16}$ and $R_{17}$ are each independently hydrogen, an alkyl group or a haloalkyl group having 1 to 10 carbon atoms, and z is an integer of 1 to 10, $Y_4$ to $Y_6$ are each independently a divalent organic group represented by the following Chemical Formula 11,

[Chemical Formula 11]

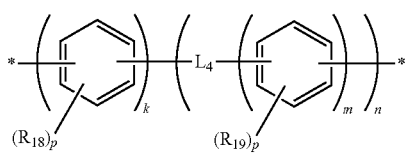

in Chemical Formula 11, $R_{18}$ and $R_{19}$ are each independently hydrogen, halogen, cyano, nitrile, an alkyl having 1 to 10 carbon atoms, an alkenyl having 1 to 10 carbon atoms, an alkoxy having 1 to 10 carbon atoms, a fluoroalkyl having 1 to 10 carbon atoms, or a fluoroalkoxy having 1 to 10 carbon atoms, p and q are each independently an integer of 0 to 4, $L_4$ is a single bond, —O—, —CO—, —S—, —SO$_2$—, —C(CH$_3$)$_2$—, —C(CF$_3$)$_2$—, —CONH—, —COO—, —(CH$_2$)$_y$—, —O(CH$_2$)$_y$O—, —O(CH$_2$)$_y$—, —NH—, —NH(CH$_2$)$_y$—NH—, —NH(CH$_2$)$_y$O—, —OCH$_2$—C(CH$_3$)$_2$—CH$_2$O—, —COO—(CH$_2$)$_y$—OCO—, or —OCO—(CH$_2$)$_y$—COO—, y is an integer of 1 to 10, k and m are each independently an integer of 0 to 3, and n is an integer of 0 to 3.

Specifically, in the polymer for the first liquid crystal alignment agent and the polymer for the second liquid crystal alignment agent included in the liquid crystal alignment agent composition according to one embodiment, $X_1$ to $X_6$ in the repeating units of Chemical Formulas 3 to S may each independently be a tetravalent functional group.

As an example, the $X_1$ to $X_6$ may be each independently a tetravalent functional group represented by Chemical Formula 10.

Further, in the polymer for the first liquid crystal alignment agent included in the liquid crystal alignment agent composition according to one embodiment, $Y_1$ to $Y_3$ in the repeating units of Chemical Formulas 3 to 5 may be each independently a divalent functional group represented by Chemical Formula 9.

In Chemical Formula 9, T is a tetravalent functional group, $D_1$ and $D_2$ are each independently an alkylene group having 1 to 20 carbon atoms, a heteroalkylene group having 1 to 10 carbon atoms, a cycloalkylene group having 3 to 20 carbon atoms, an arylene group having 6 to 20 carbon atoms or a heteroarylene group having 2 to 20 carbon atoms.

The Chemical Formula 9 corresponds to a part of the repeating unit derived from a diamine having a specific structure containing an imide group or the like, which is a precursor used for forming a polymer for a liquid crystal aligning agent.

More specifically, in Chemical Formula 9, $D_1$ and $D_2$ may be each independently the following Chemical Formula 12 or Chemical Formula 13.

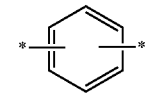

[Chemical Formula 12]

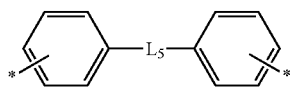

[Chemical Formula 13]

in Chemical Formula 13, $L_5$ a single bond, —O—, —SO$_2$—, or —CR$_{20}$R$_{21}$—, where $R_{20}$ and $R_{21}$ are each independently hydrogen or an alkyl having 1 to 10 carbons.

Preferably, the Chemical Formula 12 may be the following Chemical Formula 12-1.

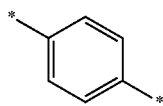

[Chemical Formula 12-1]

Further, the Chemical Formula 13 may be the following Chemical Formula 13-1.

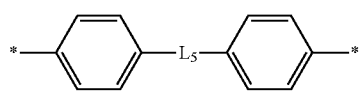

[Chemical Formula 13-1]

In Chemical Formula 13-1, $L_5$ is O, or CH$_2$.

More specifically, examples of the organic group represented by Chemical Formula 9 is not particularly limited, but for example, it may be a functional group represented by the following Chemical Formula 9-a or Chemical Formula 9-b.

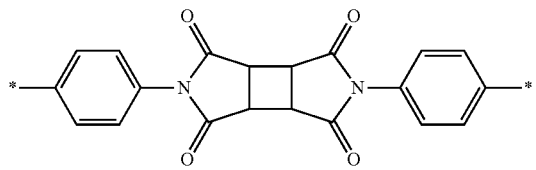

[Chemical Formula 9-a]

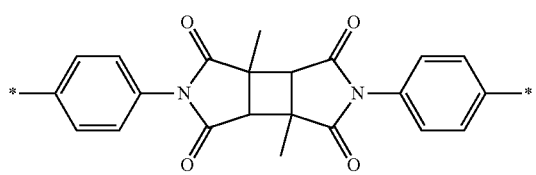

[Chemical Formula 9-b]

Further, more specifically, in Chemical Formula 9, T may be a functional group represented by the following Chemical Formula 10-1 or a functional group represented by the following Chemical Formula 10-2.

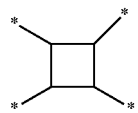

[Chemical Formula 10-1]

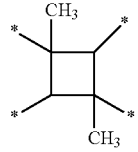

[Chemical Formula 10-2]

Further, the liquid crystal alignment agent composition according to one embodiment may include a repeating units represented by Chemical Formula 3, which is an imide repeating unit, among the repeating units represented by Chemical Formula 3, Chemical Formula 4 and Chemical Formula 5, in an amount of 5 mol % or more and 74 mol % or less, preferably 10 mol % or more and 60 mol % or less, based on the total repeating units.

As described above, when the polymer containing a specific content of the imide repeating unit represented by Chemical Formula 3 is used, the polymer for the first liquid crystal alignment agent contains a specific content of the imide repeating unit which has been already imidized. Therefore, although a high-temperature heat treatment step is omitted and light irradiation is immediately performed, it is possible to produce a liquid crystal alignment film with excellent alignment property and stability.

If the repeating unit represented by Chemical Formula 3 is contained in an amount below the range, sufficient alignment property may not be exhibited, and alignment stability may be deteriorated. If the repeating unit represented by Chemical Formula 3 is contained in an amount above the range, it may cause a problem that it is difficult to prepare a stable alignment solution which can be coated. Accordingly, it is preferable that the repeating unit represented by Chemical Formula 3 is included in an amount within the above range, in terms of providing a polymer for liquid crystal alignment which is excellent in storage stability, electrical characteristics, alignment characteristics, and alignment stability.

Further, the repeating unit represented by Chemical Formula 4 or the repeating unit represented by Chemical Formula 5 may be included in an appropriate amount depending on desired properties.

Specifically, the repeating unit represented by Chemical Formula 4 may be included in an amount of 0 mol % or more and 40 mol % or less, preferably 0 mol % or more and 30 mol % or less based on a total of the repeating units represented by Chemical Formulae 3 to 5. A conversion rate of the repeating unit represented by Chemical Formula 4 to imide is low during the high-temperature heat treatment step after light irradiation, and therefore, if its content exceeds the above range, the overall imidization rate is insufficient and the alignment stability may be lowered. Accordingly, when the repeating unit represented by Chemical Formula 4 is used within the above range, it exhibits proper solubility, thereby providing a polymer for liquid crystal alignment agent capable of achieving a high imidization rate while having excellent process property.

Further, the repeating unit represented by Chemical Formula 5 may be included in an amount of 0 mol % or more and 95 mol % or less, preferably 10 mol % or more and 90 mol % or less based on a total of the repeating units represented by Chemical Formulae 3 to 5. When the repeating unit represented by Chemical Formula 5 is used within the above range, it shows excellent coating property, thereby providing a polymer for liquid crystal alignment agent capable of achieving a high imidization rate while having excellent process property.

Specifically, in the liquid crystal alignment agent composition of the above one embodiment, at least one repeating unit selected from the group consisting of the repeating unit represented by Chemical Formula 3, the repeating unit represented by Chemical Formula 4 and the repeating unit represented by Chemical Formula 5 may include a combination of tetracarboxylic dianhydride and diamine. The combination of tetracarboxylic dianhydride and diamine corresponds to a reaction product of tetracarboxylic dianhydride and diamine. In Chemical Formulas 3 to 5, $X_1$ to $X_3$ may be a tetravalent organic group derived from a tetracarboxylic dianhydride compound used in the synthesis of a polyamic acid, a polyamic acid ester or a polyimide, and the $Y_1$ to $Y_3$ may be a divalent organic group derived from a diamine compound used in the synthesis of a polyamic acid, a polyamic acid ester or a polyimide.

That is, the tetracarboxylic dianhydride may be represented by the following Chemical Formula 10-a, and in the following Chemical Formula 10-a, the definitions of $X_0$ may be the same as those described above in Chemical Formula 10.

[Chemical Formula 10-a]

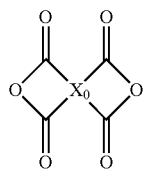

Further, the diamine may be represented by the following Chemical Formula 9-1, and in the following Chemical Formula 9-1, the definitions of $D_1$ to $D_1$ and T may be the same as those described above in the Chemical Formula 9.

[Chemical Formula 9-1]

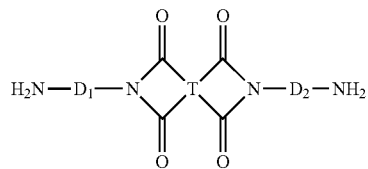

Further, in the polymer for a second liquid crystal alignment agent among the liquid crystal alignment agent composition according to one embodiment, $Y_4$ to $Y_6$ in the repeating units of Chemical Formulas 6 to 8 may be each independently a divalent functional group represented by Chemical Formula 11.

In Chemical Formula 11, $R_{18}$ and $R_{19}$ are each independently hydrogen, halogen, cyano, nitrile, an alkyl having 1 to 10 carbon atoms, an alkenyl having 1 to 10 carbon atoms, an alkoxy having 1 to 10 carbon atoms, a fluoroalkyl having 1 to 10 carbon atoms, or a fluoroalkoxy having 1 to 10 carbon atoms, p and q are each independently an integer of 0 to 4, $L_4$ is a single bond, —O—, —CO—, —S—, —SO$_2$—, —C(CH$_3$)$_2$—, —C(CF$_3$)$_2$—, —CONH—, —COO—, —(CH$_2$)$_y$—, —O(CH$_2$)$_y$O—, —O(CH$_2$)$_y$—, —NH—, —NH(CH$_2$)$_y$—NH—, —NH(CH$_2$)$_y$O—, —OCH$_2$—C(CH$_3$)$_2$—CH$_2$O—, —COO—(CH$_2$)$_y$—OCO—, or —OCO—(CH$_2$)$_y$—COO—, y is an integer of 1 to 10, k and m are each independently an integer of 0 to 3, and n is an integer of 0 to 3.

More specifically, the Chemical Formula 11 may be each independently the following Chemical Formula 14 or Chemical Formula 15.

[Chemical Formula 14]

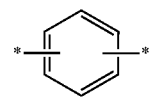

[Chemical Formula 15]

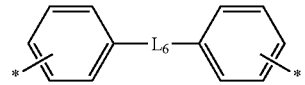

In Chemical Formula 15, $L_6$ is a single bond, —O—, —SO$_2$—, or —CR$_{26}$R$_{27}$—, wherein $R_{26}$ and $R_{27}$ are each independently hydrogen or an alkyl having 1 to 10 carbons.

Preferably, the Chemical Formula 14 may be the following Chemical Formula 14-1.

[Chemical Formula 14-1]

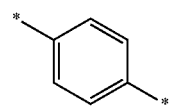

Further, the Chemical Formula 15 may be the following Chemical Formula 15-1.

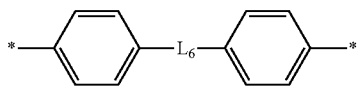

[Chemical Formula 15-1]

In Chemical Formula 15-1, $L_6$ is O, or $CH_2$.

More preferably, the Chemical Formula 11 is represented by Chemical Formula 15-1, and in Formula 15-1, $L_6$ may be —O—.

Specifically, in the liquid crystal alignment agent composition of the above one embodiment, at least one repeating unit selected from the group consisting of the repeating unit represented by Chemical Formula 6, the repeating unit represented by Chemical Formula 7 and the repeating unit represented by Chemical Formula 8 may include a combination of tetracarboxylic dianhydride and diamine. The combination of tetracarboxylic dianhydride and diamine corresponds to a reaction product of tetracarboxylic dianhydride and diamine. In Chemical Formulas 6 to 8, $X_4$ to $X_6$ may be a tetravalent organic group derived from a tetracarboxylic dianhydride compound used in the synthesis of a polyamic acid, a polyamic acid ester, or a polyimide, and the $Y_4$ to $Y_6$ may be a divalent organic group derived from a polyamic acid, a polyamic acid ester or a diamine compound used in the synthesis of polyimide.

That is, the tetracarboxylic dianhydride may be represented by the following Chemical Formula 10-a, and in the following Chemical Formula 10-a, the definitions of $X_0$ may be the same as those described above in Chemical Formula 10.

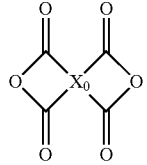

[Chemical Formula 10-a]

Further, the diamine may be represented by the following Chemical Formula 11-1, and in the following Chemical Formula 11-1, the definitions of $R_{18}$ to $R_{19}$, $L_4$, p, q, k, m and n may be the same as those described above in Chemical Formula 11.

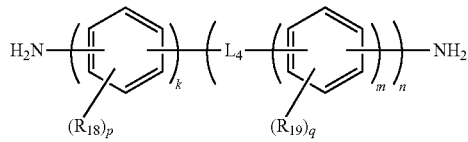

[Chemical Formula 11-1]

Meanwhile, in the liquid crystal alignment agent composition according to one embodiment, the polymer for the first liquid crystal alignment agent and the polymer for the second liquid crystal alignment agent may be included in a ratio of about 1:2 or more and 1:5 or less, preferably about 1:2 or more and 1:4 or less, or 1:2 or more and 1:3 or less.

Further, the weight average molecular weight of the polymer for the first liquid crystal alignment agent and the polymer for the second liquid crystal alignment agent may be 1000 g/mol or more and 200000 g/mol or less.

The crosslinker compound according to the above one embodiment in which the terminal crosslinking functional group is capped with a thermally removable protecting group may be a crosslinker compound having a specific chemical structure represented by the following Chemical Formula 1-1.

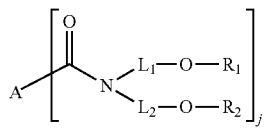

[Chemical Formula 1-1]

in Chemical Formula 1-1, A is a monovalent to tetravalent functional group, J is an integer of 1 to 4, $L_1$ and $L_2$ are equal to or different from each other, and each independently, one of an alkylene group having 1 to 10 carbon atoms or an arylene group having 6 to 20 carbon atoms, and $R_1$ and $R_2$ are each independently a silicon-containing monovalent functional group.

In Chemical Formula 1-1, A is a monovalent to tetravalent functional group, and j may be an integer of 1 to 4. The A is a functional group positioned at the center of the crosslinker compound, and the functional groups represented by curly bracket "[ ]" in Chemical Formula 1-1 may be bonded by the number of j to the terminal functional group contained in A That is, in Chemical Formula 1-1, when j is 1, A is a monovalent functional group. Also, when j is 2, A is a divalent functional group. Further, when j is 3, A is a trivalent functional group. Further, when j is 4, A is a tetravalent functional group. Preferably, in Chemical Formula 1-1, j is 2, and A may be an alkylene group having 1 to 10 carbon atoms, specifically, a butylene group.

In Chemical Formula 1-1, $L_1$ and $L_2$ are equal to or different from each other, and each independently, one of an alkylene group having 1 to 10 carbon atoms or an arylene group having 6 to 20 carbon atoms, and preferably, $L_1$ and $L_2$ may be each independently an alkylene group having 1 to 5 carbon atoms, for example, an ethylene group.

In Chemical Formula 1-1, $R_1$ and $R_2$ are a functional group substituted for a hydrogen atom at the terminal of the hydroxyl group (—OH), which is a crosslinkable functional group of the crosslinker compound, and can suppress a crosslinking reaction between the polyimide or its precursor polymer and the crosslinker compound represented by Chemical Formula 1-1.

After performing a drying step, an exposure step, a curing step, etc. for preparing a liquid crystal alignment film from a liquid crystal alignment agent composition, the $R_1$ and $R_2$ are desorbed while being replaced with hydrogen atoms when raising the temperature to 150° C. or more.

In the crosslinker compound added together with a polymer for a liquid crystal aligning agent, as in the liquid crystal alignment agent composition of the above one embodiment, when the terminal of a hydroxyl group (—OH), which is a crosslinkable functional group, is substituted with a specific functional group of $R_1$ and $R_2$ as shown in Chemical Formula 1-1, not only the film strength of the liquid crystal alignment agent composition increases, but also excellent electrical characteristics are realized.

Further, when the terminal of a hydroxy group (—OH), which is a crosslinkable functional group, is substituted with the silicon-containing functional group of $R_1$ and $R_2$, it was confirmed that by containing the silicon-containing functional group, the reactivity of the crosslinker in the initial drying step is reduced as compared with the existing hydroxyl group (—OH) terminal crosslinker, the crosslinking reaction starts after the exposure step for alignment, and thereby, the decrease in initial alignment due to the crosslinker is reduced. In addition, during the process of imidization after exposure for alignment, the conversion ratio of imidization increases and also the rearrangement ratio increases, and thus, the alignment property may be increased.

The functional groups of $R_1$ and $R_2$ introduced to the terminal of the crosslinkable functional group of the crosslinker compound is desorbed and removed when heat treated to a temperature of 90° C. or more, the hydroxy group at the terminal of the crosslinkable functional group is recovered and a smooth crosslinking reaction can proceed. At a temperature of less than 150° C., a crosslinking reaction by a crosslinking functional group is suppressed, thereby minimizing the formation of an unnecessary crosslinked structure and improving the stability and reliability of the composition. Further, during the drying or firing step of the liquid crystal alignment film, it is desorbed and removed at a temperature of about 150° C. or more by heat treatment, and the hydroxy group at the terminal of the crosslinkable functional group is recovered and a smooth crosslinking reaction proceeds, thereby improving the mechanical properties of the alignment film.

That is, in the liquid crystal alignment agent composition maintained at a temperature of less than 150° C., the structure of the crosslinker compound represented by Chemical Formula 1-1 is maintained, so that the crosslinking reaction between the polymer for liquid crystal alignment agent and the crosslinker compound represented by Chemical Formula 1-1 can be suppressed. Further, after performing a drying step, an exposure step, a curing step, etc. for preparing a liquid crystal alignment film from the liquid crystal alignment agent composition, the $R_1$ and $R_2$ in the crosslinker compound represented by Chemical Formula 1-1 are replaced with hydrogen atoms when the temperature is increased by heat treatment, and a crosslinking reaction between the polymer for liquid crystal alignment agent and the crosslinker compound represented by Chemical Formula 1-1 may proceed.

Therefore, the liquid crystal alignment agent composition of the above one embodiment can suppress the crosslinking reactivity of the crosslinker compounds added in the composition, and thus, sufficiently improve the dispersibility of the crosslinker compound and the polymer for the liquid crystal aligning agent. During the production process of the liquid crystal alignment film of another embodiment described below, the strength of the alignment film is improved through a crosslinking reaction between the crosslinker compound and the polymer for the liquid crystal alignment agent in the composition, and excellent alignment characteristics and electrical characteristics can be realized in the finally produced liquid crystal alignment cell.

The $R_1$ and $R_2$ may be each independently a silicon-containing monovalent functional group.

Specifically, the silicon-containing monovalent functional group may be a functional group represented by the following Chemical Formula 2.

[Chemical Formula 2]

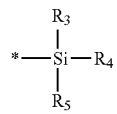

in Chemical Formula 2, $R_3$ to $R_5$ may be each independently hydrogen, or an alkyl having 1 to 10 carbon atoms.

More specifically, in Chemical Formula 2, $R_3$ to $R_5$ may be an alkyl having 1 to 10 carbon atoms, preferably a methyl group.

In Chemical Formula 1-1, A is an alkylene group having 1 to 10 carbon atoms, and j may be 2. That is, the crosslinker compound represented by Chemical Formula 1-1 may include a compound represented by the following Chemical Formula 1-a.

[Chemical Formula 1-a]

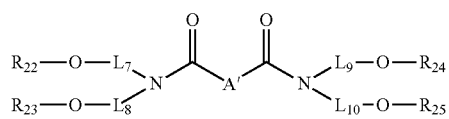

in Chemical Formula 1-a, A' is an alkylene group having 1 to 10 carbon atoms, $L_7$ to $L_{10}$ are each independently an alkylene group having 1 to 5 carbon atoms, and $R_{22}$ to $R_{25}$ may be each independently a silicon-containing monovalent functional group.

More specifically, an example of the crosslinker compound represented by Chemical Formula 1-a may be a compound represented by the following Chemical Formula 1-b wherein A' is a butylene group having 4 carbon atoms, $L_7$ to $L_{10}$ all are an ethylene group having 2 carbon atoms, and $R_{22}$ to $R_{25}$ all are a functional group represented by Chemical Formula 2 ($R_3$ and $R_5$ are a methyl group).

[Chemical Formula 1-b]

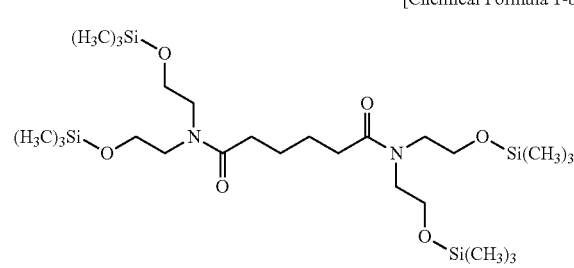

In addition, another example of the crosslinker compound represented by Chemical Formula 1-a may be a compound represented by the following Chemical Formula 1-c wherein A' is a butylene group having 4 carbon atoms, $L_7$ to $L_{10}$ all are an ethylene group having 2 carbon atoms, and $R_{22}$ to $R_{25}$ all are a functional group represented by Chemical Formula 2 ($R_{22}$ to $R_{25}$ are an ethyl group).

[Chemical Formula 1-c]

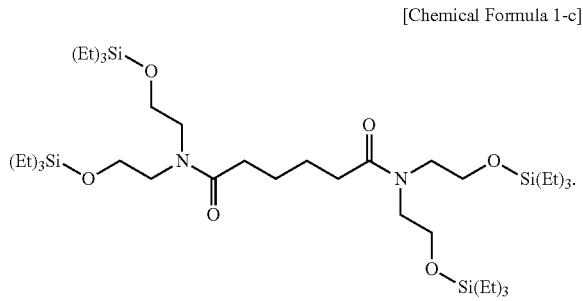

2. Liquid Crystal Alignment Film

Meanwhile, according to another embodiment of the present disclosure, there is provided a liquid crystal alignment film prepared in accordance with the method for producing a liquid crystal alignment film described above. Specifically, the liquid crystal alignment film may include an aligned cured product of the liquid crystal alignment agent composition of the one embodiment. The aligned cured product means a material obtained through an alignment step and a curing step of the liquid crystal alignment agent composition of the one embodiment.

As described above, when using a liquid crystal alignment agent composition including a polymer for liquid crystal alignment agent, and a crosslinker compound in which a terminal crosslinking functional group is capped with a silicon-containing thermally removable protecting group, wherein a change in the number of particles according to Equation 1 below is 30 or less, it is possible to prepare a liquid crystal alignment film having enhanced liquid crystal alignment properties and stability.

Specifically, the liquid crystal alignment film may have a film strength of 2H or more, or 3H or more, or 4H or more as measured using a pencil hardness tester at 50 g load in accordance with ASTM D 3363 test standard.

The thickness of the liquid crystal film is not particularly limited, but for example, it can be freely adjusted within the range of 0.01 μm or more and 1000 μm or less. When the thickness of the liquid crystal film increases or decreases by a specific value, the physical properties measured in the liquid crystal film may also change by a certain value.

Meanwhile, examples of the method for preparing a liquid crystal alignment film is not particularly limited, but for example, a method for preparing a liquid crystal alignment film including: a step of coating the liquid crystal alignment agent composition onto a substrate to form a coating film (step 1); a step of drying the coating film (step 2); a step of irradiating the dried coating film with light or rubbing the coating film to perform alignment treatment (step 3); and a step of heat-treating and curing the alignment-treated coating film (step 4) can be used.

Step 1 is a step of coating the liquid crystal alignment agent composition onto a substrate to form a coating film. The details of the liquid crystal alignment agent composition includes those described above in one embodiment.

The method of coating the liquid crystal alignment agent composition onto a substrate is not particularly limited, and for example, a method such as screen printing, offset printing, flexographic printing, inkjet, and the like can be used.

Further, the liquid crystal alignment agent composition may be dissolved or dispersed in an organic solvent. Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate and the like. They can be used alone or in combination of two or more.

In addition, the liquid crystal alignment agent composition may further include other components in addition to the organic solvent. In a non-limiting example, when the liquid crystal alignment agent composition is coated, additives capable of improving the uniformity of the thickness of a film and the surface smoothness, or improving the adhesion between a liquid crystal alignment film and a substrate, or changing the dielectric constant and conductivity of a liquid crystal alignment film or increasing the denseness of a liquid crystal alignment film, may be further included. Examples of these additives include various kinds of solvents, surfactants, silane-based compounds, dielectrics or crosslinking compounds, etc.

Step 2 is a step of drying the coating film formed by coating the liquid crystal alignment agent composition onto a substrate.

The step of drying the coating film may use methods such as heating of a coating film or vacuum evaporation, and is preferably performed at a temperature of 50° C. or more and 150° C. or less, or 60° C. or more and 140° C. or less.

Step 3 is a step of irradiating the coating film with light to perform an alignment treatment.

The coating film in the alignment treatment step may refer to a coating film immediately after the drying step, and may be a coating film subjected to heat treatment after the drying step. The "coating film immediately after the drying step" refers to irradiating the light immediately after the drying step without carrying out a heat treatment at a temperature higher than that of the drying step, and other steps other than the heat treatment can be added.

More specifically, when a liquid crystal alignment film is produced using a conventional liquid crystal alignment agent including polyamic acid or polyamic acid ester, it includes a step of irradiating light after essentially performing a high-temperature heat treatment for imidization of polyamic acid. However, when a liquid crystal alignment film is produced using the liquid crystal alignment agent of the one embodiment described above, it does not include the heat treatment step, and light is directly irradiated to perform alignment treatment, and then the alignment-treated coating film is cured by a heat treatment, thereby enabling production of a liquid crystal alignment film.

In the alignment treatment step, the light irradiation is performed by irradiating polarized ultraviolet rays having a wavelength of 150 in or more and 450 nm or less. In this case, the intensity of the light exposure may vary depending on the kind of the polymer for a liquid crystal aligning agent, and preferably an energy of 10 J/cm or more and 10 J/cm$^2$ or less, preferably an energy of 30 J/cm$^2$ or more and 2 J/cm$^2$ or less may be irradiated As for the ultraviolet rays, the polarized ultraviolet rays selected among the ultraviolet rays subjected to polarization treatment by a method of passing through or reflecting a polarizing device using a substrate in which a dielectric anisotropic material is coated on the surface of a transparent substrate such as quartz glass, soda lime glass, soda lime-free glass, etc., a polarizing plate on which aluminum or metal wires are finely deposited, or a Brewster's polarizing device by the reflection of quartz glass, etc., are irradiated to perform the alignment treatment. Herein, the polarized ultraviolet rays may be irradiated perpendicularly to the surface of the substrate, or may be irradiated by directing an angle of incidence toward a specific angle. By this method, the alignment ability of the liquid crystal molecules is imparted to the coating film.

Further, in the alignment treatment step, a rubbing treatment can use a method using a rubbing cloth. More specifically, in the rubbing treatment, the surface of the coating film after the heat treatment step can be rubbed in one direction while rotating the rubbing roller in which a rubbing cloth is attached to a metal roller Step 4 is a step of heat-treating and curing the coating film alignment-treated.

In the step of heat-treating and curing the alignment-treated coating film, $R_1$ and $R_2$ functional groups of the crosslinker compound represented by Chemical Formula 1-1 may be desorbed while being substituted with hydrogen atoms in the alignment-treated coating film, and a crosslinking reaction with the polymer for liquid crystal alignment agent may proceed.

Specifically, in the step of heat-treating and curing the alignment-treated coating film, a crosslinker compound represented by the following Chemical Formula 1-2 may be included in the alignment-treated coating film.

[Chemical Formula 1-2]

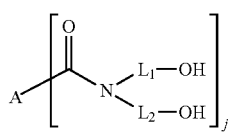

in Chemical Formula 1-2, A, j, $L_1$ and $L_2$ are the same as defined in Chemical Formula 1-1 of the above one embodiment.

Specifically, the crosslinker compound represented by Chemical Formula 1-2 may be a result of a substitution reaction of the crosslinker compound represented by Chemical Formula 1-1. In the crosslinker compound represented by Chemical Formula 1-1, the terminal of the hydroxy group (—OH), which is a crosslinkable functional group, are substituted with specific functional groups of $R_1$ and $R_2$, but as the temperature rises to 90° C. or more in the step of heat-treating and curing the alignment-treated coating film, the functional groups of Rt and $R_2$ in the crosslinker compound represented by Chemical Formula 1-1 are substituted with hydrogen atoms, and thereby, the crosslinker compound represented by Chemical Formula 1-2 can be produced.

When the crosslinker compound represented by Chemical Formula 1-2 is included in the liquid crystal alignment agent composition of the one embodiment, some crosslinking reactions proceed from within the composition and thereby, it becomes difficult for the crosslinker compound to be evenly dispersed in the composition, and storage stability is also reduced.

Meanwhile, according to the present disclosure, in the liquid crystal alignment agent composition, the crosslinking reaction in the composition is suppressed by adding a crosslinker compound represented by Chemical Formula 1-1, and then in the step of heat-treating and curing the alignment-treated coating film, the crosslinker compound represented by Chemical Formula 1-1 may be induced so as to be converted into a crosslinker compound represented by Chemical Formula 1-2. Thereby, the composition can improve the dispersibility and stability of the crosslinker compound, and in the alignment film, the effect of improving the film strength can be achieved through the formation of a crosslinked structure.

The step of heat-treating and curing the alignment-treated coating film is a step that is performed after light irradiation even in a conventional method of preparing a liquid crystal alignment film using a polymer for a liquid crystal alignment agent containing a polyamic acid or a polyamic acid ester, and is distinguished from the heat treatment step that is performed by coating a liquid crystal alignment agent onto a substrate, and then performing imidization of the liquid crystal alignment agent before irradiating the light or while irradiating the light.

In this case, the heat treatment may be performed by a heating means such as a hot plate, a hot-air circulation furnace, an infrared furnace and the like, and the heat treatment may be performed at 150° C. or more and 300° C. or less, or 200° C. or more and 250° C. or less.

Meanwhile, after a step of drying the coating film (step 2), the method may further include heat-treating the coating film immediately after the drying step at a temperature equal to or higher than that of the drying step, if necessary. The heat treatment may be performed by a heating means such as a hot plate, a hot-air circulation furnace, an infrared furnace and the like, and the heat treatment may be performed at 150° C. or more and 250° C. or less. In this process, the liquid crystal alignment agent can be imidized.

That is, the method for preparing the liquid crystal alignment film may include: a step of coating the liquid crystal alignment agent onto a substrate to form a coating film (step 1); a step of drying the coating film (step 2); a step of heat-treating the coating film immediately after the drying step at a temperature equal to or higher than the drying step (step 3); a step of irradiating the heat-treated coating film with light or subjecting the heat-treated coating film to a rubbing treatment to perform alignment treatment (step 4); and a step of heat-treating and curing the alignment-treated coating film (step 5).

3. Liquid Crystal Display Device

In addition, according to yet another embodiment of the present disclosure, there is provided a liquid crystal display device including the liquid crystal alignment film described above.

The liquid crystal alignment film may be introduced into a liquid crystal cell by a known method, and likewise, the liquid crystal cell may be introduced into a liquid crystal display device by a known method. The liquid crystal alignment film can be prepared from the liquid crystal alignment agent composition including the polymer for liquid crystal alignment agent and a crosslinker compound in which a terminal crosslinking functional group is capped with a thermally removable protecting group, thereby achieving excellent stability together with excellent various physical properties. Thereby, a liquid crystal display device capable of exhibiting high reliability is provided.

Meanwhile, the voltage holding ratio (VHR) of the liquid crystal display device measured at 1 Hz and 60° C. using 6254C instrument available from TOYO CORPORATION may be 85% or more, 85% or more and 99% or less, 88% or more and 99% or less, 89% or more and 99% or less, 90% or more and 99% or less, or 94% or more and 99% or less.

Advantageous Effects

According to the present disclosure, a liquid crystal alignment agent composition capable of realizing improved storage stability and electrical characteristics while having excellent film strength during the synthesis of a liquid crystal alignment film, a liquid crystal alignment film and a liquid crystal display device using the same can be provided.

DETAILED DESCRIPTION OF THE EMBODIMENTS

Hereinafter, the present disclosure will be described in more detail by way of Examples. However, these Examples are given for illustrative purposes only, and the scope of the present disclosure is not intended to be limited to or by these Examples.

PREPARATION EXAMPLE

Preparation Example 1: Preparation of Diamine DA-1

Diamine DA-1 was synthesized according to Reaction Scheme below:

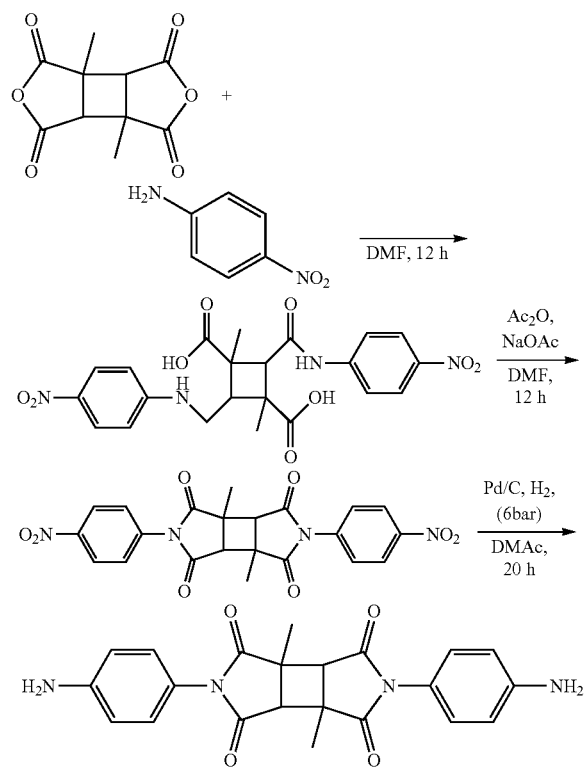

Specifically, 1,3-dimethylcyclobuthane-1,2,3,4-tetracarboxylic dianhydride (DMCBDA) and 4-nitroaniline were dissolved in dimethylformamide (DMF) to prepare a mixture. Then, the mixture was reacted at about 80° C. for about 12 hours to prepare an amic aid. Then, the amic acid was dissolved in DMF, and acetic anhydride and sodium acetate were added thereto, thereby preparing a mixture. Then, the amic acid included in the mixture was imidized at about 90° C. for about 4 hours. The thus-obtained imide was dissolved in dimethylacetamide (DMAc), and then Pd/C was added thereto, thereby preparing a mixture. The mixture was reduced at 45° C. and under hydrogen pressure of 6 bar for 20 hours, thereby preparing the diamine DA-1.

Preparation Example 2: Preparation of Crosslinker

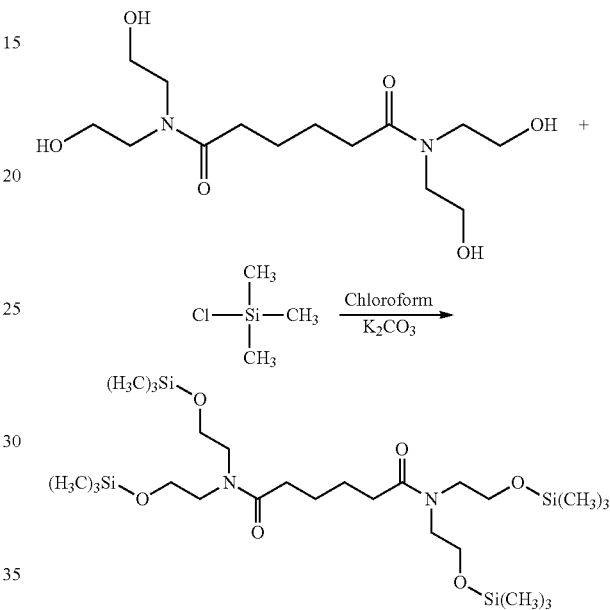

5 g (15.6 mmol) of N,N,N',N'-tetrakis(2-hydroxyethyl) adipamide and 10.2 g (94 mmol) of chlorotrimethylsilane were added to 150 ml of chloroform, and then 17.3 g (125 mmol) of potassium carbonate ($K_2CO_3$) was added thereto, and the mixture was stirred under 0° C. nitrogen environment for 10 hours. After completion of the reaction, the resulting mixture was filtered through a celite pad, and the filtrate was concentrated to give 7.3 g (yield: 77%) of N1,N1,N6,N6-tetrakis(2-(trimethylsilyloxy)ethyl)adipamide).

Comparative Preparation Example 1: Preparation of Crosslinker

N,N,N',N'-Tetrakis(2-hydroxyethyl)adipamide which is a reactant of Preparation Example 2 was used as a crosslinker of Comparative Preparation Example 1.

SYNTHESIS EXAMPLE

Synthesis Example 1: Preparation of Polymer for Liquid Crystal Alignment Agent P-1

5.665 g (0.014 mol) of DA-1 prepared in Preparation Example 1 was completely dissolved in 77.3 g of anhydrous N-methyl pyrrolidone (NMP). Then, 2.92 g (0.013 mol) of 1,3-dimethyl-cyclobutane-1,2,3,4-tetracarboxylic dianhydride (DMCBDA) was added to the solution under an ice bath, and the mixture was stirred at room temperature for 16 hours to give a polymer for a liquid crystal alignment agent P-1.

Synthesis Example 2: Preparation of Polymer for Liquid Crystal Alignment Agent Q-1

14.492 g (0.073 mmol) of 4,4'-Methylenedianiline (MDA) was completely dissolved in 195.5 g of anhydrous N-methyl pyrrolidone (NMP).

Then, 20 g (0.068 mmol) of 4,4'-biphthalic anhydride (BPDA) was added to the solution under an ice bath, and the mixture was stirred at room temperature for 16 hours to give a polymer for a liquid crystal alignment agent Q-1.

Synthesis Example 3: Preparation of Polymer for Liquid Crystal Alignment Agent Q-2

14.636 g (0.073 mmol) of 4,4'-oxydianiline (ODA) was completely dissolved in 196.3 g of anhydrous N-methyl pyrrolidone (NMP).

Then, 20 g (0.068 mmol) of 4,4'-biphthalic anhydride (BPDA) was added to the solution under an ice bath, and the mixture was stirred at room temperature for 16 hours to give a polymer for a liquid crystal alignment agent Q-2.

Examples and Comparative Examples: Preparation of Liquid Crystal Alignment Agent Composition, Liquid Crystal Alignment Film, Liquid Crystal Alignment Cell

Example 1

(1) Preparation of Liquid Crystal Alignment Agent Composition

With a composition as shown in Table 1 below, 6 g of the polymer for liquid crystal alignment agent P-1 prepared in Synthesis Example 1 and 14 g of the polymer for liquid crystal alignment agent Q-1 prepared in Synthesis Example 2 were added to 12.4 g of NMP and 7.6 g of n-butoxyethanol to obtain a 5 wt % solution. Then, to the solution, N1,N1,N6,N6-tetrakis(2-(trimethylsilyloxy)ethyl)adipamide obtained in Preparation Example 2 as a crosslinker was added in an amount of 5 wt % based on the solids content contain in the total solution, and then the mixture was stirred at 25° C. for 16 hours. Then, the obtained solution was pressure-filtered through a filter made of poly(tetrafluorene ethylene) and having a pore size of 0.1 μm, thereby preparing a liquid crystal alignment agent composition.

(2) Preparation of Liquid Crystal Alignment Film

The liquid crystal alignment agent composition was coated onto each of the upper and lower substrates for the voltage holding ratio (VHR) in which an ITO electrode having a thickness of 60 nm and an area of 1 cm×1 cm was patterned on a rectangular glass substrate having a size of 2.5 cm×2.7 cm using a spin coating method. Then, the substrates onto which the liquid crystal alignment agent composition was coated were placed on a hot plate at about 70° C. and dried for 3 minutes to evaporate the solvent.

In order to subject the thus-obtained coating film to alignment treatment, ultraviolet rays of 254 nm were irradiated with an intensity of about 0.1 to 1 J/m using an exposure apparatus in which a linear polarizer was adhered to the coating film of each of the upper/lower plates. Subsequently, the alignment-treated upper/lower plates were calcinated (cured) in an oven at about 230° C. for 30 minutes to obtain a coating film having a thickness of 0.1 μm.

(3) Preparation of Liquid Crystal Alignment Cell

A sealing agent impregnated with ball spacers having a size of 4.5 μm was coated onto the edge of the upper plate excluding the liquid crystal injection hole. Then, the alignment films formed on the upper plate and the lower plate were aligned such that they faced each other and the alignment directions were aligned with each other, and then the upper and lower plates were bonded together and the sealing agent was UV and heat cured to prepare an empty cell. Then, a liquid crystal was injected into the empty cells and the injection hole was sealed with a sealing agent to prepare a liquid crystal alignment cell.

Example 2

A liquid crystal alignment agent composition, a liquid crystal alignment film, and a liquid crystal alignment cell were produced in the same manner as in Example 1, except that with a composition as shown in Table 1 below, the crosslinker was added in an amount of 10 wt % based on the solid content contained in the total solution.

Example 3

A liquid crystal alignment agent composition, a liquid crystal alignment film, and a liquid crystal alignment cell were produced in the same manner as in Example 1, except that with a composition as shown in Table 1 below, the crosslinker was added in an amount of 15 wt % based on the solid content contained in the total solution.

Example 4

A liquid crystal alignment agent composition, a liquid crystal alignment film, and a liquid crystal alignment cell were produced in the same manner as in Example 1, except that with a composition as shown in Table 1 below, the polymer for liquid crystal alignment agent Q-2 prepared in Synthesis Example 3 was used instead of the polymer for liquid crystal alignment agent Q-1 prepared in Synthesis Example 2.

Comparative Example 1

A liquid crystal alignment agent composition, a liquid crystal alignment film, and a liquid crystal alignment cell were produced in the same manner as in Example 1, except that with a composition as shown in Table 1 below, the crosslinker of Preparation Example 2 was not added.

Comparative Example 2

A liquid crystal alignment agent composition, a liquid crystal alignment film, and a liquid crystal alignment cell were produced in the same manner as in Example 1, except that with a composition as shown in Table 1 below, N,N,N',N'-tetrakis(2-hydroxyethyl)adipamide of Comparative Preparation Example 1 instead of the crosslinker of Preparation Example 2 was added in an amount of 3 wt % based on the solid content contained in the total solution.

Comparative Example 3

A liquid crystal alignment agent composition, a liquid crystal alignment film, and a liquid crystal alignment cell were produced in the same manner as in Example 1, except that with a composition as shown in Table 1 below, N,N, N',N'-tetrakis(2-hydroxyethyl)adipamide of Comparative Preparation Example 1 instead of the crosslinker of Preparation Example 2 was added in an amount of 8 wt % based on the solid content contained in the total solution.

Reference Example 1

A liquid crystal alignment agent composition, a liquid crystal alignment film, and a liquid crystal alignment cell were produced in the same manner as in Example 1, except that with a composition as shown in Table 1 below, a crosslinker represented by the following Chemical Formula A instead of the crosslinker of Preparation Example 2 was added in an amount of 3 wt % based on the solid content contained in the total solution.

parallel to the alignment axis of the liquid crystal alignment cell. Then, the liquid crystal cell to which the polarizing plates were adhered was placed on a backlight with luminance of 7000 cd/m*, and light leakage was observed with the naked eye. At this time, if the alignment properties of the liquid crystal alignment film are excellent and the liquid crystal is arranged well, light is not passed through the upper and lower polarizing plates adhered vertically to each other, and it is observed dark without defects. In this case, the alignment properties are evaluated as 'good', and when light leakage such as liquid crystal flow mark or bright spot is observed, it is evaluated as 'poor'. The results are shown in Table 2 below.

[Chemical Formula A]

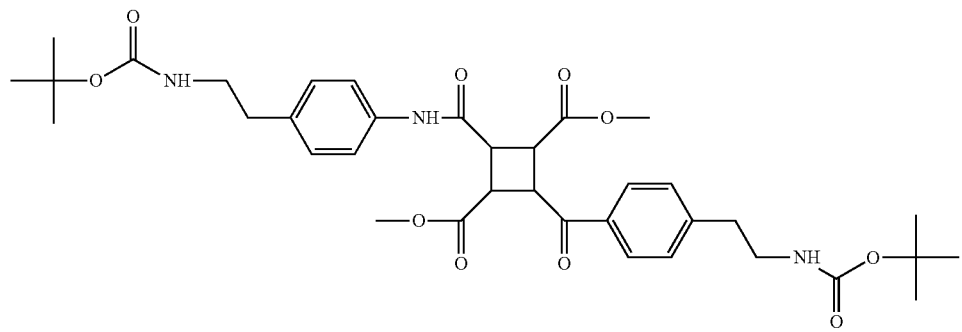

TABLE 1

| | First polymer | | Second polymer | | Mixing weight ratio of first and second polymers | Crosslinker | |
|---|---|---|---|---|---|---|---|
| | Type | Addition amount (g) | Type | Addition amount (g) | | Type | Addition amount (wt % relative to solid content) |
| Example 1 | P-1 | 6 | Q-1 | 14 | 30:70 | Preparation Example 2 | 5 |
| Example 2 | P-1 | 6 | Q-1 | 14 | 30:70 | Preparation Example 2 | 10 |
| Example 3 | P-1 | 6 | Q-1 | 14 | 30:70 | Preparation Example 2 | 15 |
| Example 4 | P-1 | 6 | Q-2 | 14 | 30:70 | Preparation Example 2 | 15 |
| Comparative Example 1 | P-1 | 6 | Q-1 | 14 | 30:70 | — | — |
| Comparative Example 2 | P-1 | 6 | Q-1 | 14 | 30:70 | Comparative Preparation Example 1 | 3 |
| Comparative Example 3 | P-1 | 6 | Q-1 | 14 | 30:70 | Comparative Preparation Example 1 | 8 |
| Reference Example 1 | P-1 | 6 | Q-1 | 14 | 30:70 | Chemical Formula A | 3 |

Experimental Example

1) Evaluation of Liquid Crystal Alignment Properties

Polarizers were adhered to the upper and lower plates of the liquid crystal cell prepared above so as be perpendicular to each other. At this time, the polarization axis of the polarizing plate attached to the lower plate was made to be 2) Measurement of Voltage Holding Ratio (VHR)

The voltage holding ratio (VHR) which is an electrical characteristic of the liquid crystal alignment cells obtained in the previous Examples and Comparative Examples was measured using TOYO 6254 instrument. The voltage holding ratio was measured under the severe conditions of 1V, 1 Hz, and 60° C., and the results are shown in Table 2 below.

3) Film Strength

With respect to the liquid crystal alignment films obtained in the previous Examples and Comparative Examples, the film strength of the alignment film was measured, and the results are shown in Table 2 below. Specifically, the film strength of the alignment film was measured using pencils of various hardness by a pencil hardness tester at 50 g load in accordance with ASTM D 3363 test standard.

4) Change in Number of Particles

With respect to the liquid crystal alignment agent compositions obtained in the previous Examples and Comparative Examples, the change in the number of particles according to Equation 1 below was measured.

$$\text{Change in Number of Particles } (\Delta EA) = EA_1 - EA_0 \quad \text{[Equation 1]}$$

in Equation 1, $EA_0$ is the number of particles having a particle size of 0.5 μm or more contained in the liquid crystal alignment agent composition at the first point of time (0 seconds) at which the liquid crystal alignment agent composition is obtained, and $EA_1$ is the number of particles having a particle size of 0.5 μm or more contained in the liquid crystal alignment agent composition at the point of time after storing the liquid crystal alignment agent composition under the temperature conditions of about minus 70° C. for 30 days from the first point of time (0 second).

In Equation 1, the number of particles was measured as follows. The number of particles for five channels of 02 μm or more, 0.3 μm or more, 0.5 μm or more, 1.0 μm or more, and 2.0 μm or more was measured using a liquid particle sensor (KS-42B, Rion Co., Ltd., light source wavelength of 780 nm, light source output of 40 mW, flow rate of 10 mL/min, maximum number of particles of 1200/mL, simultaneous measurement loss of 5%, DC12V) under the conditions of 23° C. and a particle class of 1000 or less, and then the number of particles could be calculated by adding all the numbers of particles measured in the channels 0.5 μm or more, 1.0 μm or more, 2.0 μm or more channels.

TABLE 2

| | Evaluation of liquid crystal alignment characteristics | Evaluation of voltage holding ratio (%) | Film strength | $EA_0$ | $EA_1$ | EA |
|---|---|---|---|---|---|---|
| Example 1 | Good | 89 | 3H | 7 | 12 | 5 |
| Example 2 | Good | 93 | 4H | 12 | 21 | 9 |
| Example 3 | Good | 88 | 3H | 9 | 13 | 4 |
| Example 4 | Good | 94 | 4H | 11 | 14 | 3 |
| Comparative Example 1 | Good | 65 | 1H | 6 | 10 | 4 |
| Comparative Example 2 | Good | 90 | 3H | 5 | 563 | 558 |
| Comparative Example 3 | Poor | 92 | 3H | 15 | 4405 | 4390 |
| Reference Example 1 | Good | 68 | 1H | 4 | 9 | 5 |

As shown in Table 2, it was confirmed that the liquid crystal alignment agent compositions of Examples containing the crosslinker of Preparation Example 2 together with the polyimide-based polymer in the composition exhibited excellent liquid crystal alignment characteristics and at the same time, the film strength exhibited a high value of 3H or more and 4H or less, and the voltage holding ratio rate exhibited a very high value of 88% or more and 94% or less. Thereby, it was confirmed that the alignment cells produced from the liquid crystal alignment agent compositions of Examples had excellent alignment characteristics and film strength, and at the same time, realized excellent electrical characteristics.

On the contrary, it was confirmed that in the case of the alignment film obtained from the liquid crystal alignment agent composition of Comparative Example 1 not containing the crosslinker of Preparation Example 2, the film strength was measured with 1H, and thus, the film strength was very poor, and also the voltage holding ratio showed 65%, which was significantly reduced compared to Examples.

Meanwhile, it was confirmed that in the case of the liquid crystal alignment agent compositions of Comparative Examples 2 and 3 using the crosslinker of Comparative Preparation Example 1, the voltage holding ratio was shown to be the same level as that of the liquid crystal alignment agent compositions of Examples, but the change in the number of particles was 550 or more which showed that the number of particles greatly changed compared to the Examples, and further, the long-term storage stability of the liquid crystal alignment agent composition was significantly inferior to that of Examples of the present disclosure.

On the contrary, it was confirmed that the liquid crystal alignment agent compositions of Examples containing the crosslinker of Preparation Example 2 exhibited a change in number of particles of 9 or less, which showed a change in the number of particles of the same level as the liquid crystal alignment agent composition of Comparative Example 1 containing no crosslinker.

In addition, the alignment film obtained from the liquid crystal alignment agent composition of Reference Example 1 using the crosslinker represented by Chemical Formula A had a film strength of 1H, and thus, the film strength was very poor, and the voltage holding ratio appeared to be 68%, which was greatly reduced compared to Examples.

Thereby, it was confirmed that the liquid crystal alignment agent composition of Examples containing the crosslinker of Preparation Example 2 appears to have a markedly small change in the number of particles, and the long-term storage stability was very good, and at the same time, excellent alignment property, film strength, and excellent electrical characteristics were realized.

The invention claimed is:

1. A liquid crystal alignment agent composition comprising:
a polymer for liquid crystal alignment agent; and
a crosslinker compound having a terminal crosslinking functional group capped with a silicon-containing thermally removable protecting group,
wherein a change in the number of particles according to Equation 1 below is 30 or less $$\text{Change in Number of Particles } (\Delta EA) = EA_1 - EA_0 \quad \text{[Equation 1]}$$

in the Equation 1, $EA_0$ is the number of particles having a particle size of 0.5 μm or more contained in the liquid crystal alignment agent composition at the first point of tune (0 second) at which the liquid crystal alignment agent composition is obtained, and $EA_1$ is the number of articles having a particle size of 0.5 μm or more contained in the liquid crystal alignment agent composition at the point of time after storing the liquid crystal alignment agent composition at −20° C. or more and 0° C. or less for 30 days from the first point of time (0 second), the Number of Particles is measured using a particle size analyzer at a temperature of 15° C. or more and 35° C. or less and a particle class of 1000 or less, and ΔEA is determined using 1 ml of the liquid crystal alignment agent composition, wherein the liquid crystal alignment agent composition includes a polymer resin solution in which the polymer for the liquid crystal alignment agent and the crosslinker compound are dissolved in an organic solvent, and wherein the crosslinker compound is represented by Chemical Formula 1-1,

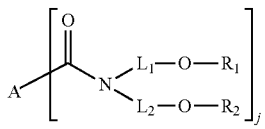

[Chemical Formula 1-1]

in the Chemical Formula 1-1,

A is a monovalent to tetravalent functional group, j is an integer of 1 to 4, $L_1$ and $L_2$ are equal to or different from each other, and each independently an alkylene group having 1 to 10 carbon atoms or an arylene group having 6 to 20 carbon atoms, and $R_1$ and $R_2$ are each independently a silicon-containing monovalent functional group.

2. The liquid crystal alignment agent composition of claim 1, wherein the particles includes a precipitate of the crosslinker compound.

3. The liquid crystal alignment agent composition of claim 1, wherein the organic solvent is selected from the group consisting of N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, and ethylene glycol monobutyl ether acetate.

4. The liquid crystal alignment agent composition of claim 1, wherein the particles are dispersed in the polymer resin solution.

5. The liquid crystal alignment agent composition of claim 1, wherein the crosslinker compound is included in an amount of 0.1% by weight or more and 30% by weight or less based on the solid content in the polymer resin solution.

6. The liquid crystal alignment agent composition of claim 1, wherein the liquid crystal alignment agent composition includes at least one selected from the group consisting of a polyamic acid repeating unit, a polyamic acid ester repeating unit, and a polyimide repeating unit.

7. The liquid crystal alignment agent composition of claim 1, wherein the liquid crystal alignment agent composition includes a first polymer for a first liquid crystal alignment agent including at least one repeating unit selected from the group consisting of a repeating unit represented by the Chemical Formula 3, a repeating unit represented by Chemical Formula 4 and a repeating unit represented by Chemical Formula 5; and a second polymer for a second liquid crystal alignment agent comprising at least one repeating unit selected from the group consisting of a repeating unit represented by Chemical Formula 6, a repeating unit represented by Chemical Formula 7 and a repeating unit represented by Chemical Formula 8:

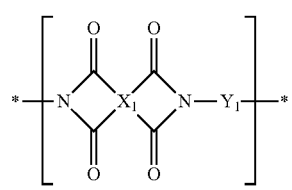

[Chemical Formula 3]

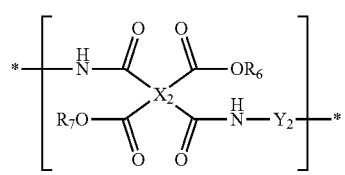

[Chemical Formula 4]

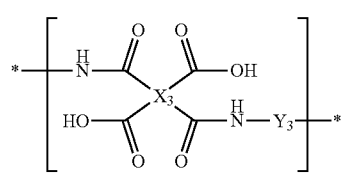

[Chemical Formula 5]

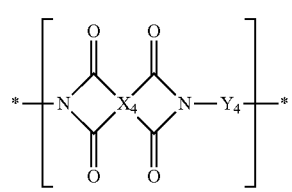

[Chemical Formula 6]

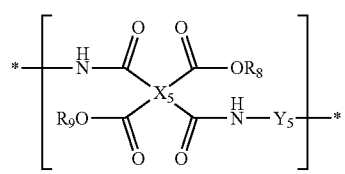

[Chemical Formula 7]

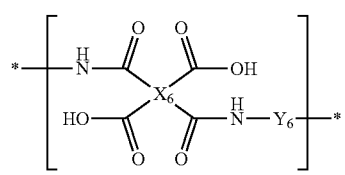

[Chemical Formula 8]

in the Chemical Formulae 3 to 8, at least one of $R_6$ and $R_7$ is an alkyl group having 1 to 10 carbon atoms and the rest is hydrogen, at least one of $R_8$ and $R_9$ is an alkyl group having 1 to 10 carbon atoms and the rest is hydrogen, $X_1$ to $X_6$ are each independently a tetravalent organic group, $Y_1$ to $Y_3$ are each independently a divalent organic group represented by Chemical Formula 9,

[Chemical Formula 9]

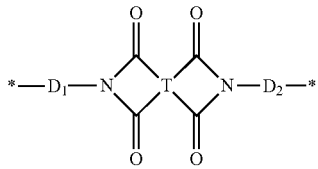

in the Chemical Formula 9,

T is a tetravalent organic group represented by Chemical Formula 10, $D_1$ and $D_2$ are each independently an alkylene group having 1 to 20 carbon atoms, a heteroalkylene group having 1 to 10 carbon atoms, a cycloalkylene group having 3 to 20 carbon atoms, an arylene group having 6 to 20 carbon atoms, or a heteroarylene group having 2 to 20 carbon atoms,

[Chemical Formula 10]

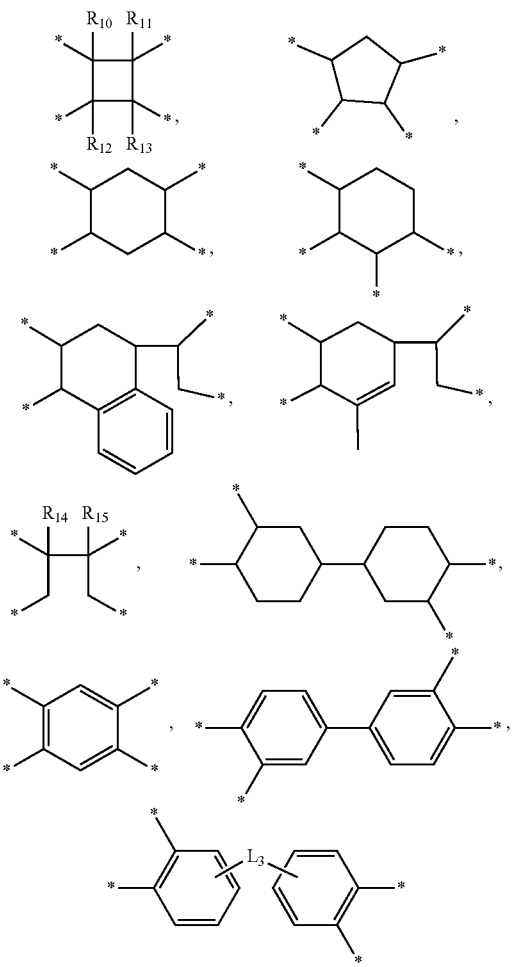

in the Chemical Formula 10, $R_{10}$ and $R_{15}$ are each independently hydrogen or an alkyl group having 1 to 6 carbon atoms, $L_3$ is any one selected from the group consisting of a single bond, —O—, —CO—, —COO—, —S—, —SO—, —SO$_2$—, —CR$_{16}$R$_{17}$—, —(CH$_2$)$_z$—, —O(CH$_2$)$_z$O—, —COO(CH$_2$)$_z$OCO—, —CONH—, phenylene and combinations thereof, where $R_{16}$ and $R_{17}$ are each independently hydrogen, an alkyl group leaving 1 to 10 carbon atoms or a haloalkyl group leaving 1 to 10 carbon atoms, and z is an integer of 1 to 10, and $Y_4$ to $Y_6$ are each independently a divalent organic group represented by Chemical Formula 11,

[Chemical Formula 11]

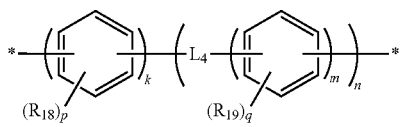

in the Chemical Formula 11, $R_{18}$ and $R_{19}$ are each independently hydrogen, halogen, cyano, nitrile, an alkyl having 1 to 10 carbon atoms, an alkenyl having 1 to 10 carbon atoms, an alkoxy having 1 to 10 carbon atoms, a fluoroalkyl having 1 to 10 carbon atoms, or a fluoroalkoxy having 1 to 10 carbon atoms, p and q are each independently an integer of 0 to 4, $L_4$ is a single bond, —O—, —CO—, —S—, —SO$_2$—, —C(CH$_3$)$_2$—, —C(CF$_3$)$_2$—, —CONH—, —COO—, —(CH$_2$)$_y$—, —O(CH$_2$)$_y$O—, —O(CH$_2$)$_y$—, —NH—, —NH(CH$_2$)$_y$—NH—, —NH(CH$_2$)$_y$O—, —OCH$_2$—C(CH$_3$)$_2$—CH$_2$O—, —COO—(CH$_2$)$_y$—OCO—, or —OCO—(CH$_2$)$_y$—COO—, y is an integer of 1 to 10, k and m are each independently an integer of 0 to 3, and a is an integer of 0 to 3.

8. The liquid crystal alignment agent composition of claim 7, wherein the first polymer and the second polymer are included in a weight ratio of 1:2 or more and 1:5 or less.

9. A liquid crystal alignment film comprising an aligned cured product of the liquid crystal alignment agent composition of claim 1.

10. A liquid crystal display device comprising the liquid crystal alignment film of claim 9.

11. A method for producing a liquid crystal alignment film comprising the steps of 1) coating the liquid crystal aligning agent composition of claim 1 onto a substrate to form a coating film;
2) drying the coating film;
3) irradiating the dried coating film with light or rubbing the coating film to perform alignment treatment; and
4) heat-treating and curing the alignment-treated coating film.

12. The method for producing a liquid crystal alignment film of claim 11, wherein the liquid crystal aligning agent composition is dissolved or dispersed in an organic solvent.

13. The method for producing a liquid crystal alignment film of claim 11, wherein the drying of Step 2 is performed at a temperature of 50° C. or more and 150° C. or less.

14. The method for producing a liquid crystal alignment film of claim 11, wherein the alignment treatment of Step 3 includes irradiating polarized ultraviolet rays having a wavelength of 150 nm to 450 nm.

15. The method for producing a liquid crystal alignment film of claim 11, further comprising a step of heat-treating the coating film immediately after the drying step at a temperature equal to or higher than the drying step.

* * * * *